United States Patent
Marsh et al.

(10) Patent No.: US 8,798,221 B1
(45) Date of Patent: Aug. 5, 2014

(54) METHOD AND APPARATUS FOR EFFICIENT ACQUISITION OF PREAMBLES WITH ENHANCED INTERFERENCE MITIGATION

(71) Applicant: QUALCOMM Incorporated, San Diego, CA (US)

(72) Inventors: Gene Wesley Marsh, Encinitas, CA (US); Arumugam Chendamarai Kannan, San Diego, CA (US); Petru Cristian Budianu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/833,933

(22) Filed: Mar. 15, 2013

(51) Int. Cl.
*H04L 7/00* (2006.01)
*H04L 1/00* (2006.01)

(52) U.S. Cl.
CPC .................................. *H04L 1/0054* (2013.01)
USPC ........................................................ 375/365

(58) Field of Classification Search
CPC ............................. H04L 7/042; H04J 3/0608
USPC .......... 375/365, 219, 295, 345; 370/310, 296; 455/296, 561
See application file for complete search history.

(56) References Cited

U.S. PATENT DOCUMENTS

| | | | |
|---|---|---|---|
| 7,076,015 B2 | 7/2006 | Bhatoolaul et al. | |
| 7,991,077 B1 | 8/2011 | Lee et al. | |
| 8,014,435 B2 | 9/2011 | Brink et al. | |
| 8,064,414 B2 | 11/2011 | Wallace et al. | |
| 8,238,320 B2 | 8/2012 | Kim et al. | |
| 8,315,191 B2 * | 11/2012 | Glazko et al. | 370/310 |
| 8,391,552 B1 * | 3/2013 | Shaffer | 382/103 |
| 2005/0281316 A1 | 12/2005 | Jang et al. | |
| 2008/0112356 A1 | 5/2008 | Jung et al. | |
| 2010/0177844 A1 | 7/2010 | Ko et al. | |
| 2011/0069781 A1 | 3/2011 | Deguchi | |
| 2011/0200058 A1 | 8/2011 | Mushkin et al. | |
| 2012/0044796 A1 | 2/2012 | Yoon et al. | |

* cited by examiner

*Primary Examiner* — Khai Tran
(74) *Attorney, Agent, or Firm* — Arent Fox LLP

(57) ABSTRACT

Various aspects of an approach for acquiring sequences such as balanced Hamming weight preamble sequences are described herein. The approach provides for the acquisition of preamble sequences base on energy accumulation. The approach includes creating a plurality of synchronization hypotheses, with each hypothesis being created based on energies sampled at a first location and a second location in a plurality of locations associated with a sequence of transmitted symbols; calculating a plurality of metrics based on the plurality of synchronization hypotheses, wherein each metric is associated with a hypothesis; selecting, as a candidate, one hypothesis from the plurality of synchronization hypotheses including a maximum associated metric. The approach may further include determining a boundary in the sequence of transmitted symbols based on a correlation property of the sequence of transmitted symbols. The second location includes a predetermined offset from the first location configured to provide enhanced interference immunity.

68 Claims, 9 Drawing Sheets

METHOD AND APPARATUS FOR EFFICIENT ACQUISITION OF PREAMBLES WITH ENHANCED INTERFERENCE MITIGATION

BACKGROUND

1. Field

Aspects of the present disclosure relate generally to wireless communication systems, and more particularly, to a method and apparatus for efficient acquisition of preambles with enhanced interference mitigation.

2. Background

Wireless communications technology has penetrated nearly every aspect of a person's daily routine. Integrated into almost every conceivable electronic device to facilitate business activities as well as personal uses such as entertainment, medicine, and exercise, wireless systems are widely deployed to provide various types of communication content such as voice, data, video, and so on. One type of wireless system technology, referred to as a wireless personal area network (WPAN), provides a wireless communication network for interconnecting devices locally around an individual person. For example, WPAN technology may serve to interconnect the now ubiquitous cell phone with other electronic and communication devices that many people may encounter at their work place, such as printers, scanners, copiers, "wired" multi-line telephone sets, keyboards, mice, etc.; or during personal activities such as exercising, shopping, or dining, such as exercise machines, cash registers, cycling speedometers/odometers, pedometers, automated menu systems, etc. WPAN technology may even serve a more specialized purpose, such as in health care, where wireless sensors may be placed on or near a patient to allow medical professionals to monitor that patient—whether that patient is actually in a medical care facility such as a hospital or remotely through the use of a cell phone or other wireless communication device carried around by that patient.

In order for devices to wirelessly communicate with each other, they must be able to synchronize their timing as well as identify each other. Thus, one key aspect of any communication system is timing acquisition, where a receiver acquires precise timing information regarding a transmitter. Acquisition is typically accomplished by the transmitter sending a mutually shared preamble sequence and the receiver constantly checking for the presence of this sequence, where one way of achieving synchronization is through transmission of predefined sets of signals preceding data in a transmission between the devices. For example, transmission of each data packet by a transmitting device may be preceded by a transmission of a structured sequence of alternating 1's and zeros to allow a receiving device to synchronize its local clock with that of the transmitting device. These transmitted structures are generally referred to as preamble structures.

The characteristics of a good timing acquisition algorithm include accuracy, low power consumption, immunity to interferers, and low complexity/memory requirements. Specifically, in low power duty-cycled communication systems such as ultra wideband systems, acquisition accounts for a significant part of the power consumption at the receiver node. Existing methods of timing acquisition tend to use a known fixed or pseudo-random sequence of a pre-determined length, usually independent of the data rate mode. At the receiver, acquisition algorithms are based on the concept of maximizing correlation, which tends to provide accurate timing as well as good interference immunity. However, these approaches are typical not generally memory efficient, and also do not scale well in variable data rate systems because of their complexity and operational latency. Further, although existing approaches for creating preamble structures involve generation of preamble sequences that have good correlation properties, only some of these preamble sequence generation approaches also take into account resource use on the receiving device to allow for efficient detection of these preamble sequences. Fewer still of these preamble sequence generation approaches can also support creation of a large universe of possible preamble sequences having these good correlation properties to be able to support a large number of devices.

In order to be able to support a large number of devices with distinctive preamble sequences that allow efficient acquisition on the receiver and the other desirable properties as mentioned above, other approaches are desired.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of an approach for acquisition of packet preambles are described herein. The approach provides for the acquisition of preamble sequences based on energy accumulation for a transmitted sequence. The approach includes symbol timing detection of the timing of the symbols for preamble sequences, where each preamble sequence may be configured with one or more repetitions of a preamble block associated with the preamble sequence. Preamble boundary detection may be used to detect a separation of each preamble block, from which a particular preamble sequence may be determined.

In one aspect, the disclosure provides a method for preamble acquisition that includes creating a plurality of synchronization hypotheses, with each hypothesis being created based on energies sampled at a first location and a second location in a plurality of locations associated with a sequence of transmitted symbols; calculating a plurality of metrics based on the plurality of synchronization hypotheses, wherein each metric is associated with a hypothesis; and, selecting, as a candidate, a hypothesis from the plurality of synchronization hypotheses including a maximum associated metric.

Another aspect of the disclosure provides an apparatus for preamble acquisition including a processor; and a memory coupled to the processor. The memory includes instructions executable by the processor for creating a plurality of synchronization hypotheses, with each hypothesis being created based on energies sampled at a first location and a second location in a plurality of locations associated with a sequence of transmitted symbols; calculating a plurality of metrics based on the plurality of synchronization hypotheses, wherein each metric is associated with a hypothesis; and, selecting, as a candidate, a hypothesis from the plurality of synchronization hypotheses including a maximum associated metric.

Yet another aspect of the disclosure provides an apparatus for preamble acquisition including means for creating a plurality of synchronization hypotheses, with each hypothesis being created based on energies sampled at a first location and a second location in a plurality of locations associated with a sequence of transmitted symbols; means for calculating a plurality of metrics based on the plurality of synchronization hypotheses, wherein each metric is associated with a hypothesis; and, means for selecting, as a candidate, a hypothesis from the plurality of synchronization hypotheses including a maximum associated metric.

Still yet another aspect of the disclosure provides a computer program product for preamble acquisition that includes a machine-readable storage medium including instructions stored thereon, wherein the instructions are embodied as code executable for creating a plurality of synchronization hypotheses, with each hypothesis being created based on energies sampled at a first location and a second location in a plurality of locations associated with a sequence of transmitted symbols; calculating a plurality of metrics based on the plurality of synchronization hypotheses, wherein each metric is associated with a hypothesis; and selecting, as a candidate, a hypothesis from the plurality of synchronization hypotheses including a maximum associated metric.

These and other aspects of the invention will become more fully understood upon a review of the detailed description, which follows.

BRIEF DESCRIPTION OF THE DRAWINGS

These and other sample aspects of the disclosure will be described in the detailed description that follow, and in the accompanying drawings.

Figure 1:
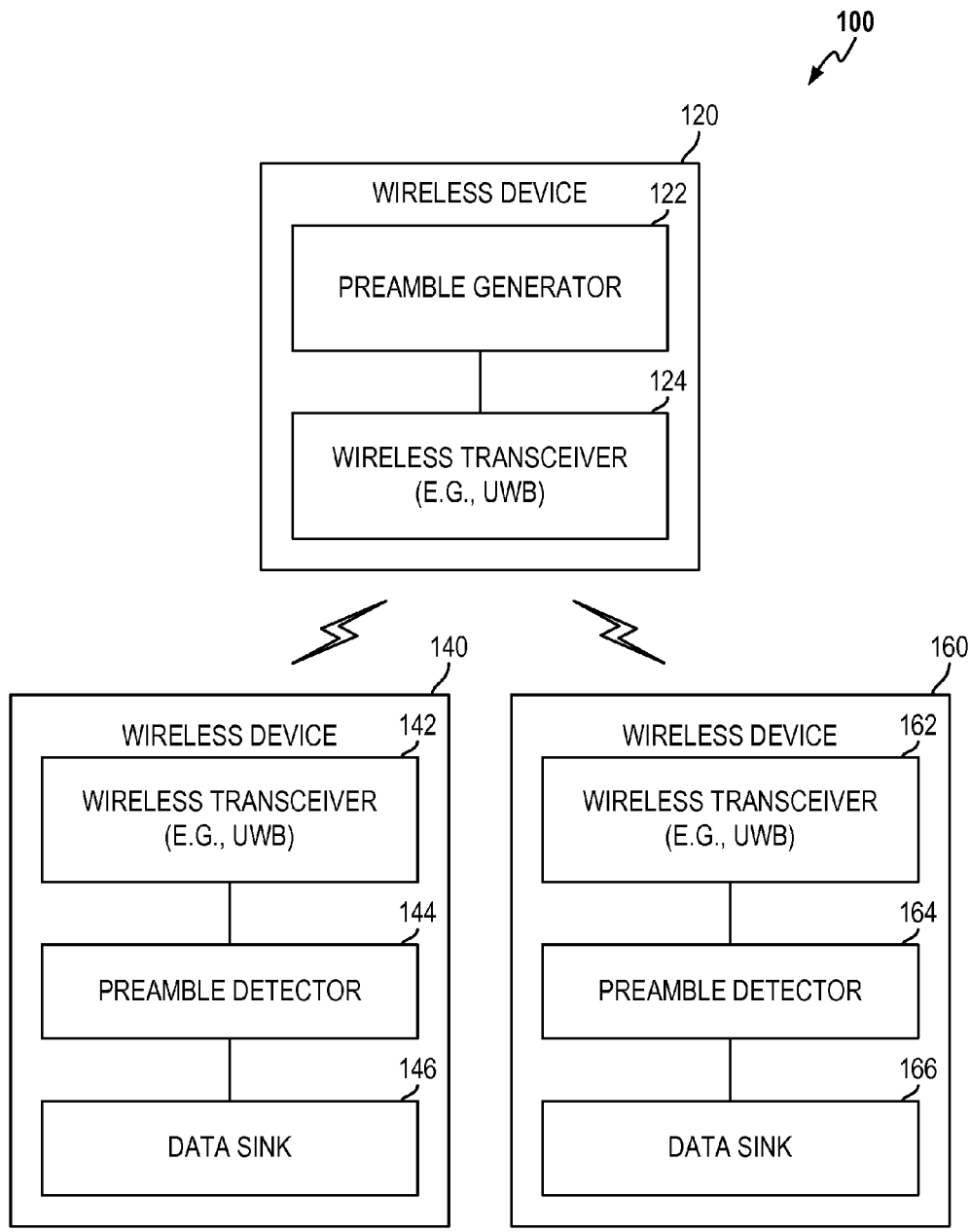
FIG. 1 is a block diagram conceptually illustrating an example of a communication scenario to which various aspects of a disclosed approach for efficient acquisition of preamble sequences may be applied.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of an acquisition approach described herein provide for a class of fixed hopping sequences that allows for efficient acquisition on a receiver. Moreover, the time and power consumed by acquisition in a variable data rate system may often be limited by the slowest data rate modes, which tend to have the longest preambles. The proposed acquisition algorithm is not limited by the slowest data rate mode and scales gracefully in terms of power and memory requirements as the data rate modes vary while maintaining timing accuracy and interference mitigation. In one aspect of the disclosed approach, the proposed acquisition algorithm is optimized for acquiring balanced weight sequences. These sequences are a class of periodic, pseudo-random, fixed hopping sequences whose structure allows for efficient timing acquisition. One example of a balanced weight sequence is a balanced Hamming weight sequence.

Various aspects of the disclosed approach provide efficient approaches of acquiring balanced weight sequences for use in communication signals such as preamble signals. The balanced weight property provides a receiver with enhanced detection of transmitted sequences such as preamble signals, as the receiver can expect an equal number of symbols in a transmitted balanced weight sequence. The balanced weight sequences may also include such sequences such as balanced Hamming weight sequences. A large number of balanced weight sequences may be generated to create one or more allowed sets, each of which may be unique so that the balanced weight sequences may simultaneously be used with multiple communication sessions and devices.

The balanced weight sequences used herein may be designed to satisfy other requirements, such as sequences having minimal cross-correlation with delayed versions of themselves and other sequences in the allowed set. Thus, sequences may be selected from generated balanced weight sequences if they have good correlation properties, which may include small cross-correlation properties with other sequences (including shifted versions of themselves), large autocorrelation properties, or both small cross-correlation and large autocorrelation properties. Various approaches known by those in the art may be used to select balanced weight sequences having a particular emphasis on one or more of these properties. Typically, sequences are considered to have good correlation properties when there is very little correlation between the sequences as they are shifted against each other, such as from a complex inner product of one sequence with a shifted version of another sequence.

FIG. 1 illustrates sample aspects of a communications scenario 100 where a first wireless device 120 may need to communicate with a second wireless device 140. In order to do so, in one aspect of the disclosed approach the first wireless device 120 may first establish communication with the second wireless device 140 by first generating and then transmitting a preamble signal having a balanced weight. The first wireless device 120 may generate a preamble sequence to be used in the preamble signal in a preamble generator 122 configured in accordance with a manner as discussed herein. In one aspect of the disclosed approach, the preamble generator 122 may generate an Mary sequence of length L, using one of the procedures described herein. The first wireless device 120 may communicate with the second wireless device 140 via a wireless transceiver 124 using the generated sequence, where the wireless transceiver 124 may be an ultra-wideband (UWB)-capable transceiver. The second wireless device 140 also includes a wireless transceiver 142 that may operate with the wireless transceiver 124 of the first wireless device 120.

In various aspects of the disclosed approach, because a receiver such as the second wireless device 140 knows the common seed used by a transmitter such as the first wireless device 120, the exact same sequences may be generated at the receiver in order to perform sequence detection. As further described herein, a process of detecting such sequences may be based on energy accumulation of a received signal containing transmitted sequences. For example, in a binary case (i.e., M=2 such that a two symbol set consisting of zeros and ones is used), acquisition may be based on energy accumulation using three criteria—energy in the zeros, energy in the ones as well as the total energy. The receiver may thus accumulate the energy in all locations that it expects a one, and all other locations where it expects a zero for different possible sequence hypotheses. The hypothesis that yields the maximum total energy while exceeding a certain threshold of energy in both zeros and ones is declared the winning candidate. In addition to the maximum energy detection, the additional condition check of the energy in the zeros and ones provides greater immunity to interferers and noise as well.

In addition to communicating with the second wireless device 140, the first wireless device 120 may also communicate with other wireless devices, an example of which is a third wireless device 160 as illustrated in FIG. 1 that also includes a wireless transceiver 162 that is configured to communicate with the wireless transceiver 124 of the first wireless device 120. In that case, the first wireless device 120 may use the preamble generator 122 to generate another preamble signal with another preamble sequence for the third wireless device 160. In one aspect of the disclosed approach, this other preamble sequence generated for the third wireless device 160 is different from the preamble sequence generated for the second wireless device 140. The use of different preamble sequences allows different wireless devices to differentiate between transmissions sent from the first wireless device 120. Further, with appropriate characteristics, the different preamble sequences may enhance orthogonality between the transmissions of the different wireless devices, thereby reducing interference.

Each of the second wireless device 140 and the third wireless device 160 may acquire a respective preamble signal transmitted from the first wireless device 120 to establish timing synchronization and communication with the first wireless device 120. In one aspect of the disclosed approach, to acquire the preamble signal sent from the first wireless device 120, the second wireless device 140 and the third wireless device 160 respectively include preamble detectors 144 and 164 that may efficiently acquire preamble sequences. In one aspect of the disclosed approach, the preamble sequences transmitted by the first wireless device 120 will be configured to have a balanced weight. The second wireless device 140 and the third wireless device 160 also respectively include data sinks 146 and 166 to receive information once a communication channel has been established with the first wireless device 120. Further, although not shown herein to avoid unnecessarily complicating the description of various aspects of the disclosed approach, each of the second wireless device 140 and the third wireless device 160 may also include a preamble generator similar to the preamble generator 122 of the first wireless device 120 that may be used to generate a balanced weight sequence to communicate with the first wireless device 120.

The elements of the communications scenario 100 may be implemented in different ways in different applications. For example, the various aspects of the approach described herein may be implemented in a system where components are attached to one another (e.g., where components are interconnected by wires) or in a system where components are detached from one another (e.g., a wireless system). Also, the various aspects of the approach herein may be employed in conjunction with processing of various types of information. For example, in some implementations this information may include control information that may be used to control certain operations at different components. In some implementations this information may include data such as audio data, video data, sensor data, or gaming data.

Various well-known methods and elements may be implemented for communicating between the first wireless device 120, and the second wireless device 140 and third wireless device 160, and unless otherwise noted, no further description will be provided herein as to these methods and elements so as to allow the various aspects of the disclosed approach to be more thoroughly discussed.

An integral part of the proposed acquisition approach is a structure of sequences that may be used as preamble sequences between a transmitter such as the first wireless device 120 and a receiver such as the second wireless device 140. In one aspect of the disclosed approach, the sequences that are transmitted may include one or more repetitions of a binary symbol sequence of length L, where each block of L symbols, which may also be referred to herein as a "preamble block," is a commonly shared preamble sequence between the transmitter and the receiver. Each preamble sequence may be formed using pseudorandom values that are generated by a linear feedback shift register (LFSR), where an initial state of the LFSR is a commonly shared seed. Because of the pseudo-random aspect of the pseudo-random preamble sequence generated by the LSFR, a given bit of the sequence may be either 0 or 1 with no guaranteed distribution of either symbol. Because it is desirable in the proposed acquisition approach for the preamble block to have a balanced weight characteristic, the output of the LSFR may be used to create balanced weight sequences for use in the preamble blocks. Various aspects of one approach for generating balanced weight sequences are disclosed herein. The provided example should not be taken as limiting; however, because the disclosed approach for sequence acquisition may operate with all balanced weight sequences—regardless of how they are generated. Further, as used herein, the sequence (including the one or more repetitions of the preamble block) may be referred to as a "transmitted sequence," and each transmission of the transmitted sequence may be referred to as a "sequence transmission."

In one aspect of the disclosed approach, a desirable transmission constraint is that the transmitted sequence may be transmitted using a fixed hopping pattern where, for each sequence transmission, all the zeros of the transmitted sequence are transmitted at a slot $S_0[p]$, and all the ones of the transmitted sequence are transmitted at another slot $S_1[q]$, where p and q may represent index values for respective fixed hopping sequences of slot values for zeros and ones, respectively. For example, where a fixed hopping pattern involves a repeating hopping sequence of 8 hops over 32 possible slots (numbered 1-32), example sequences that may be used for the values of $S_0[p]$ and $S_1[q]$ may be shown as:

$S_0[p]=\{2, 14, 3, 9, 4, 7, 1, 11\}$, and
$S_1[q]=\{17, 31, 19, 23, 25, 32, 18, 29\}$, where $S_0[p]$ and $S_1[q]$ represent the values of the slots where all zeros and all ones may be transmitted, respectively. Thus, for example, assuming the first sequence transmission occurs at p=q=1, the second sequence transmission occurs at p=q=2, the third sequence transmission occurs at p=q=3, etc., then:

$S_0[1]=2, S_0[2]=14, S_0[3]=3, \ldots$, and,
$S_1[1]=17, S_1[2]=31, S_1[3]=19, \ldots$, where the values of p and q may loop from 1 to 8 for as many sequence transmissions as necessary. The slots may represent a particular assignment either in time and/or frequency, and thus $S_0[p]$ and $S_1[q]$ may each represent a slot number associated with either a time or a frequency value.

Figure 2:
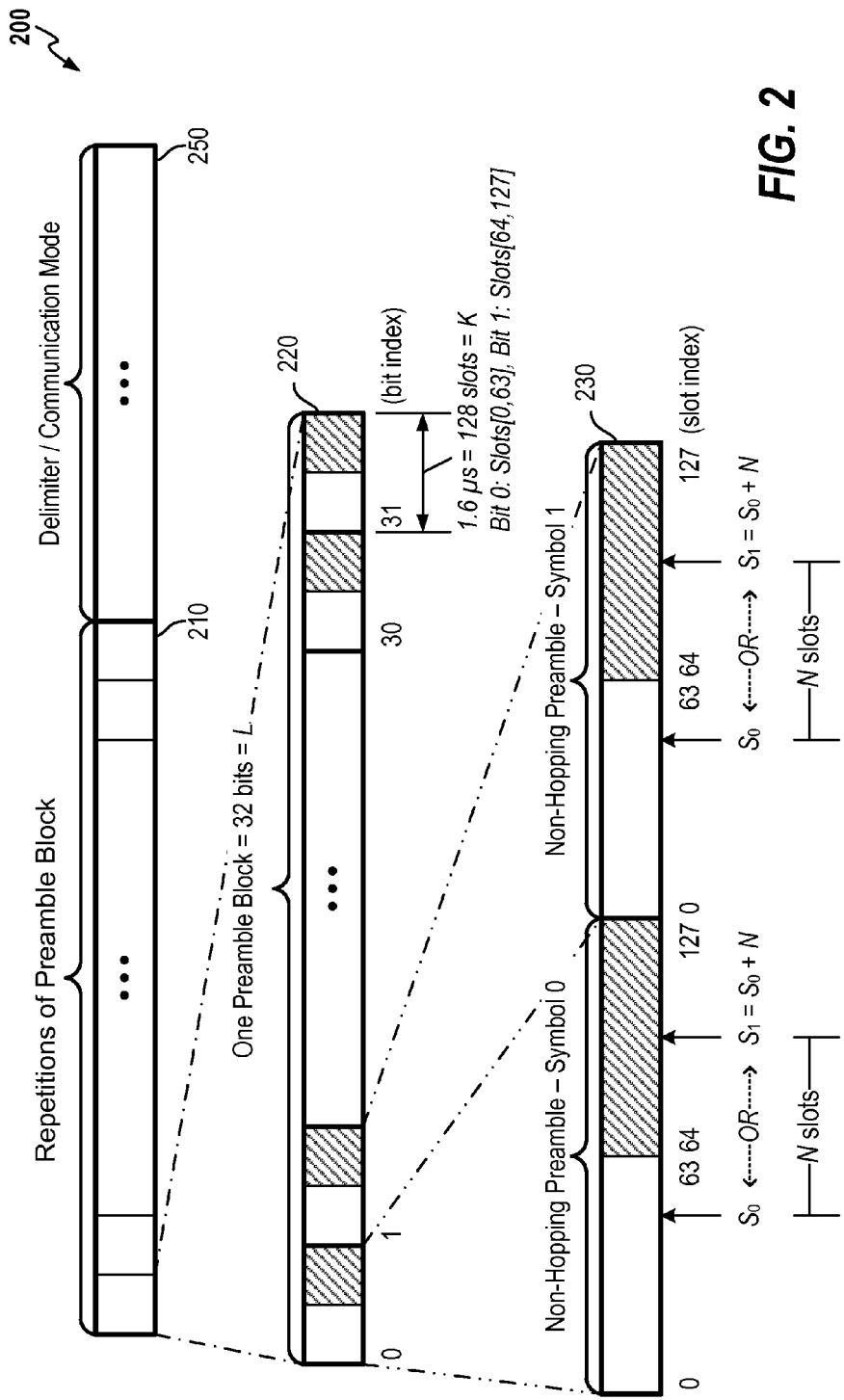
FIG. 2 is a block diagram illustrating a preamble header configured in accordance with various aspects of the disclosed approach for efficient acquisition of preamble sequences.

An example of a packet preamble 200 as configured with a sequence having the desirable transmission constraint discussed herein is shown in FIG. 2. The packet preamble 200 contains a plurality of preamble blocks 210 and a delimiter/communication mode portion 250. The delimiter/communication mode portion 250 may be used to signal a delimiter between an end of the packet preamble 200 and a beginning of a packet payload portion (not shown). The delimiter/communication mode portion 250 may also indicate one or more communication modes that the transmitter will use when communicating with the receiver.

The plurality of preamble blocks 210 may be used by the receiver to recover timing information from the transmitter and may be described using the following parameters, where:

L is the length (in bits) of the commonly shared pseudo-random preamble sequence (preamble block);
K is the number of slots used for transmitting each symbol;
$S_0$ and $S_1$ are the slot locations where the zeros and ones are positioned in each preamble (block) in the sequence transmission, respectively; and,
N is a predetermined spacing between $S_0$ and $S_1$.

In the example illustrated in FIG. 2, each preamble block 220 in the plurality of preamble blocks 210 has a length of 32 bits (L=32), where each bit is transmitted as a symbol 230. In other words, each preamble block 220 includes 32 symbols, wherein each symbol represents ones bit. In one aspect of the disclosed approach, each symbol spans a period of 1.6 μs and is divided into 128 slots (K=128), where each slot may be referred to using an index value from 0 to 127 (shown as [0,127]). For a binary (e.g., zero, one) symbol set, the 128 slots may be divided into two ranges with each range being associated with one of the symbols. Each possible value of the symbol may be signaled by transmitting a pulse at a slot in one of the two ranges. For example, where $S_0$ is a slot index assigned for the signaling of a zero, and $S_1$ is a slot index assigned for the signaling of a one, the 128 slots may be divided into two ranges. Thus, $S_0$ may be set to a slot index ranging from 0 to 63 (shown as [0,63]), and $S_1$ is set to a slot index ranging from 64 to 127 (shown as [64,127]).

In general, a symbol period may be divided into K slots. For an M-ary symbol set, these K slots may further be divided into M ranges, where each of these M ranges may be associated with one of the M-ary symbols. In one aspect of the disclosed approach, each possible value of the M-ary symbol set may be signaled by transmitting a pulse at a predetermined slot in an associated range.

Figure 3:
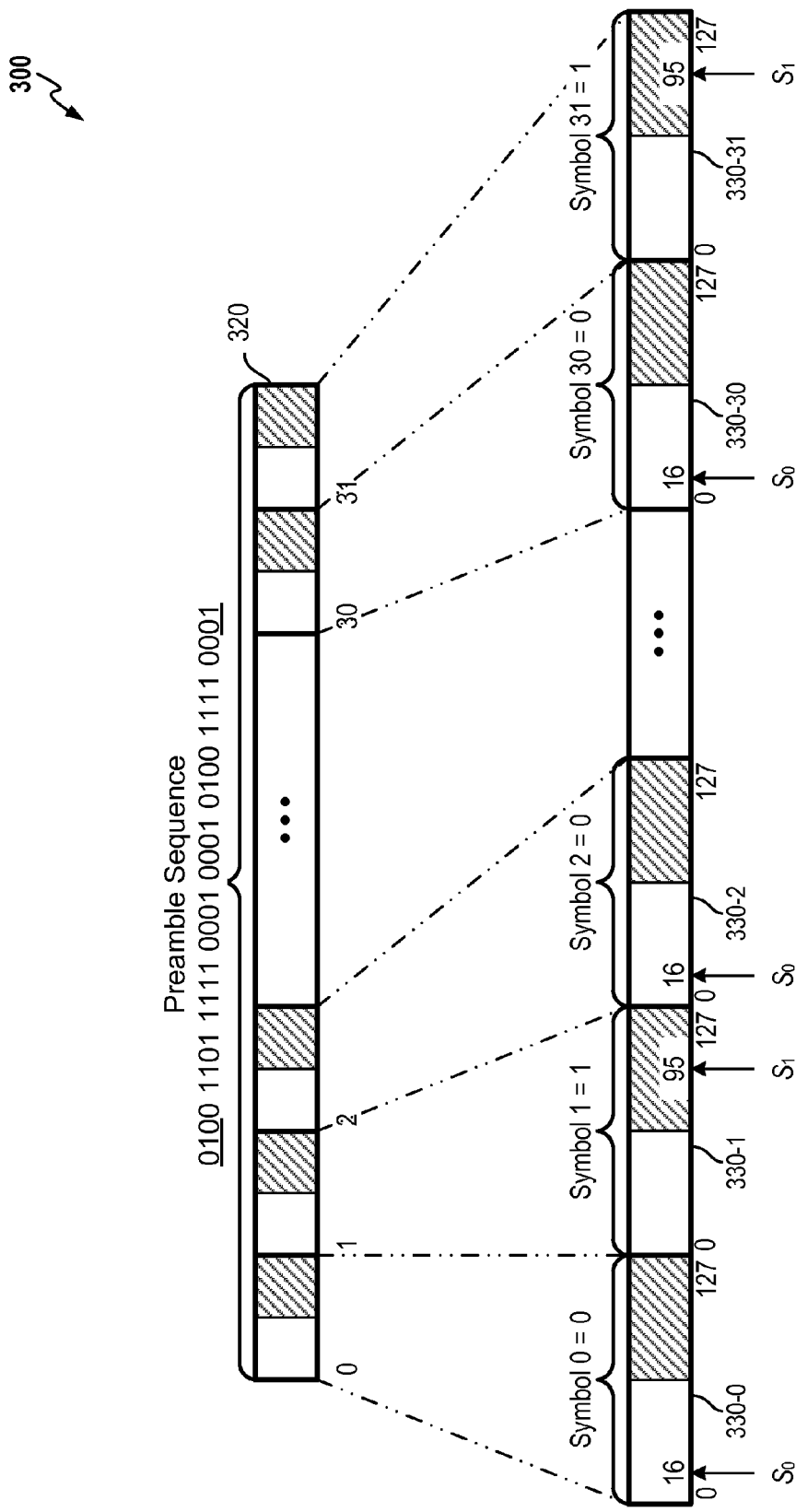
FIG. 3 is a block diagram illustrating a specific example of a preamble block configured in accordance with various aspects of the disclosed approach for efficient acquisition of preamble sequences.

FIG. 3 illustrates a preamble block 300 configured in accordance with one example of the disclosed approach, where a preamble sequence 320 includes a sequence of 32-bits configured as 01001101111100010001010011110001. As discussed above, each bit may be signaled by a symbol from a plurality of symbols 330-0 to 330-31, where, in a non-hopping configuration, the transmitter is configured to transmit all zeros to the receiver at slot 16 and all ones to the receiver at slot 95. Thus, $S_0=16$, N=79, and $S_1=S_0+N=95$. In accordance with the sequence, the receiver should expect to detect a transmission (e.g., a pulse) at $S_0$ for symbol 330-0 because the first bit of the preamble sequence in the preamble sequence 320 is 0; a transmission at $S_1$ for symbol 330-1 because the second bit of the preamble sequence in the preamble sequence 320 is 1, a transmission at $S_0$ for symbol 330-2 because the third bit of the preamble sequence in the preamble sequence 320 is 0, and so on, up to a transmission at $S_0$ for symbol 330-30 because the thirty-first bit of the preamble sequence in the preamble sequence 320 is 0, and a transmission at $S_1$ for symbol 330-31 because the thirty-second bit of the preamble sequence in the preamble sequence 320 is 1.

In one aspect of the disclosed approach, an assignment of the values of $S_0$ and N (and thereby $S_1$ because $S_1=S_0+N$), and a particular sequence to be used as the preamble block may be unique to a particular receiver. These values may be generated using channel or MAC identifiers. For example, a MAC address of each receiver may be used to assign these various values. The assignment of unique values allows the transmitter to specifically designate a receiver, and allows receivers to differentiate those transmissions that are designated for them and those that are not. Further, in one aspect of the disclosed approach, an additional constraint may be imposed such that a distance N between $S_1$ and $S_0$ will not equal K/2 (N≠K/2). Thus, in the specific example provided herein, the N may range from 2 to 126, but not equal to This additional constraint provides enhanced jammer immunity, as will be discussed below.

Various aspects of the disclosed approach provide for multiple transmissions of the chosen preamble sequence, where each transmission of the chosen preamble sequence includes transmission of one or more repetitions of the preamble block of L symbols. In one aspect of the disclosed approach, as discussed above, the slot values assigned to the transmissions of zeros and ones are changed for each sequence transmission, thus allowing the positions of zeros and 1's to "hop" to a different location for each sequence transmission. As with the non-hopping example of the preamble sequence transmission, where the values of $S_0$ and N is pre-shared between the transmitter and the receiver, the sequence of changes of the index positions is also pre-shared between the transmitter and the receiver. These sequences, which may be referred to as "hopping sequences," "hop sequences," or "hop preamble sequences," may provide for jammer immunity as a third party would have to have knowledge of the hopping sequence to be able to effectively jam the transmission.

Figure 7:
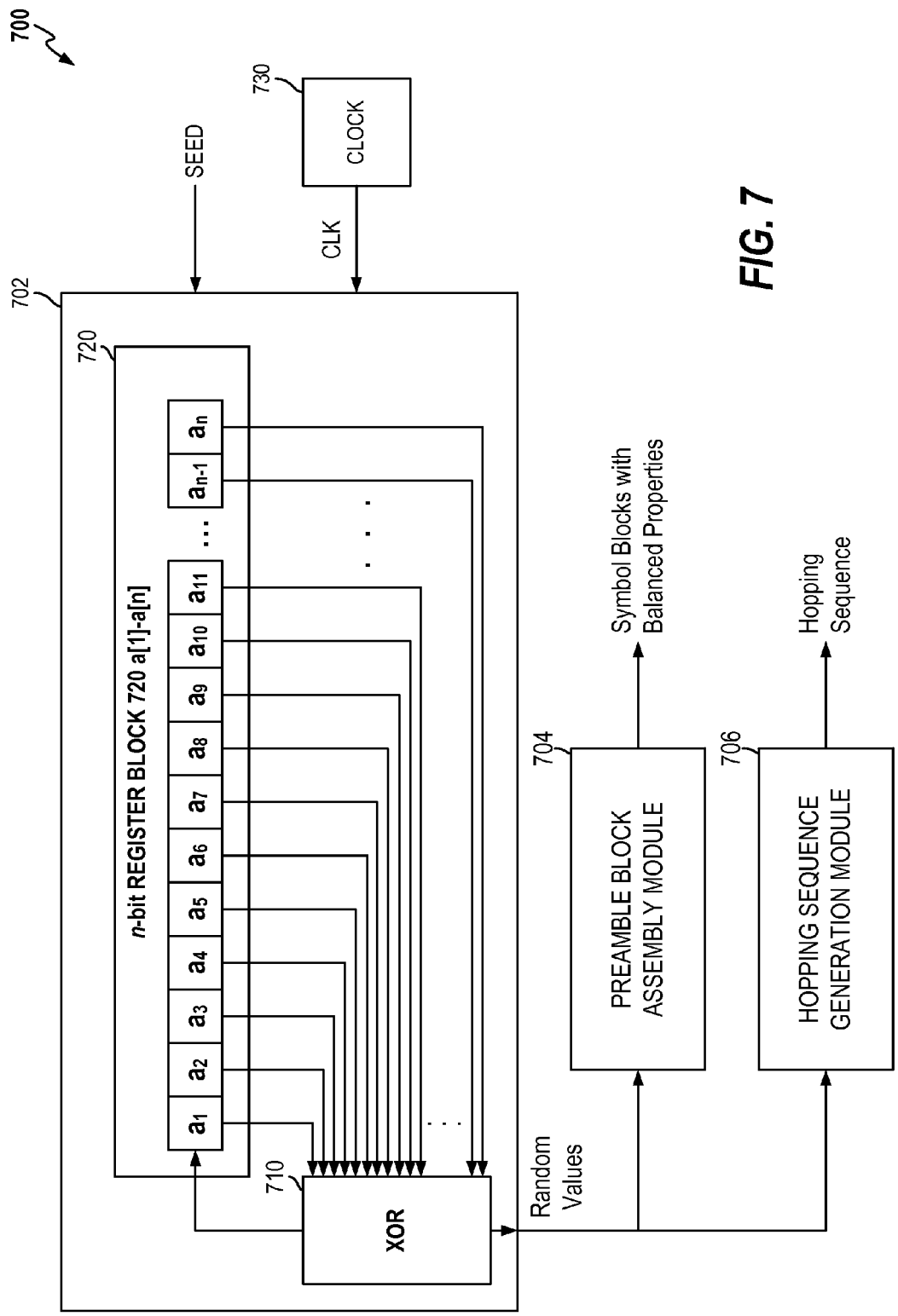
FIG. 7 is a block diagram of a balanced weight sequence generator that may be used to generate preamble sequences for preamble acquisition in accordance with various aspects of the disclosed approach.

In accordance with various aspects of the disclosed approach, a balanced weight sequence generator contained in a preamble generator of a transmitter such as the preamble generator 122 of the first wireless device 120, an example of which is illustrated in FIG. 7 and is further described herein, may include a random number generator to generate pseudo-random sequences to be used for constructing balanced weight preamble sequences as well as for creating hopping sequences. The first wireless device 120 may use a seed to initialize the random number generator. A receiver such as the second wireless device 140 may also be provided with the same seed to initialize a random number generator in a balanced weight sequence generator that may be contained in the receiver, such as in the preamble detector 144 of the second wireless device 140. Because the receiver shares the same seed as the transmitter, the receiver may generate the same pseudo-random sequence as generated by the transmitter. The receiver may then use this pseudo-random sequence to create the same preamble block in order to perform sequence detection. The receiver may also use this pseudo-random sequence to create the same hopping sequence as that created by the transmitter. As described herein, the transmitter may use a different seed for each receiver so that the transmitter may configure a different preamble block and/or hopping sequence for each receiver. Thus, a receiver as the third wireless device 160 may be provided with a seed different from the seed provided to the second wireless device 140. As provided by the example described above, the MAC address of each receiver may be used as the seed for that receiver to allow the transmitter and the receiver to generate the same values of $S_0$ and N, and any hopping sequences if a hopping sequence configuration is desired.

Figure 4:
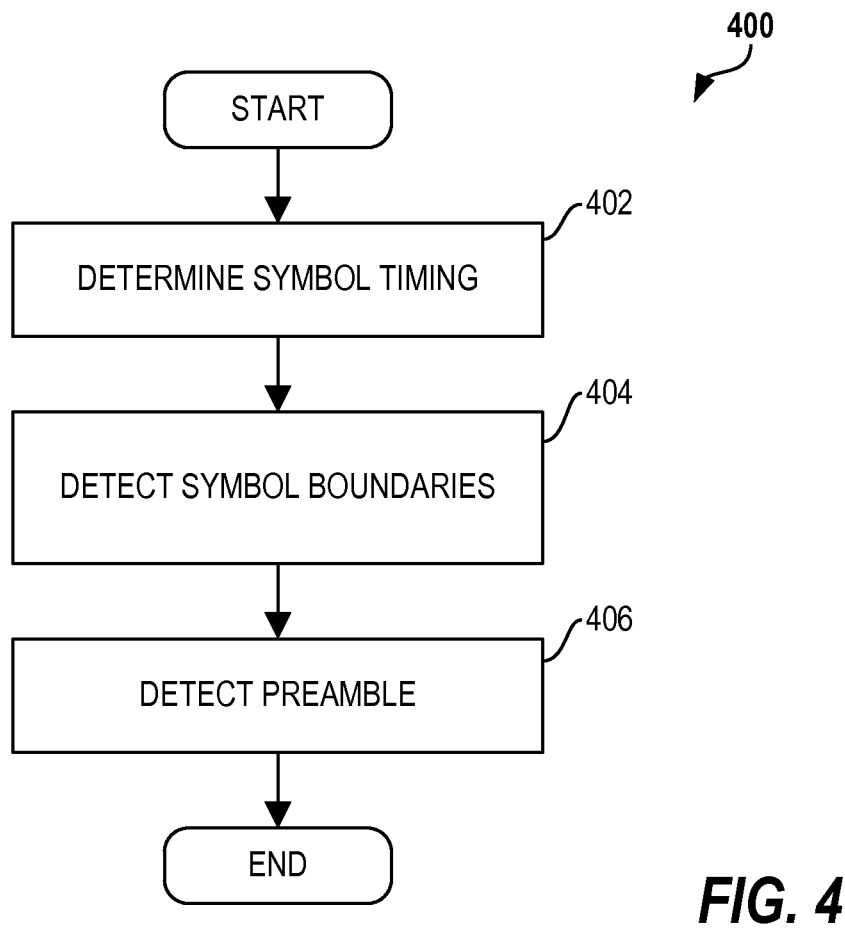
FIG. 4 is a flow diagram illustrating a preamble acquisition process configured in accordance with various aspects of the disclosed approach for efficient acquisition of preamble sequences.

FIG. 4 illustrates a preamble acquisition process 400 that may be used for acquiring preamble sequences by a receiver such as the second wireless device 140 using the preamble detector 144. The preamble sequences may be contained in a header portion of a packet such as the packet preamble 200 of FIG. 2 that is transmitted by a transmitter such as the first wireless device 120 of FIG. 1. The packet may also contain a payload portion for conveying any packet data to be communicated by the transmitter. In one aspect of the disclosed approach, operation of the preamble acquisition process 400 is based on energy accumulation where, in a first phase, a symbol timing detection phase at 402 is used to detect symbol timing for symbols that make up the preamble sequences of the packet. A second phase includes a symbol boundary detection process at 404 that is used to determine a boundary between the symbols of each preamble block. Then, at 406, a preamble detection phase may be used to determine a start and end of the plurality of preamble blocks 210, from which an end of the preamble and a beginning of the payload portion of the packet may be determined.

Figure 6:
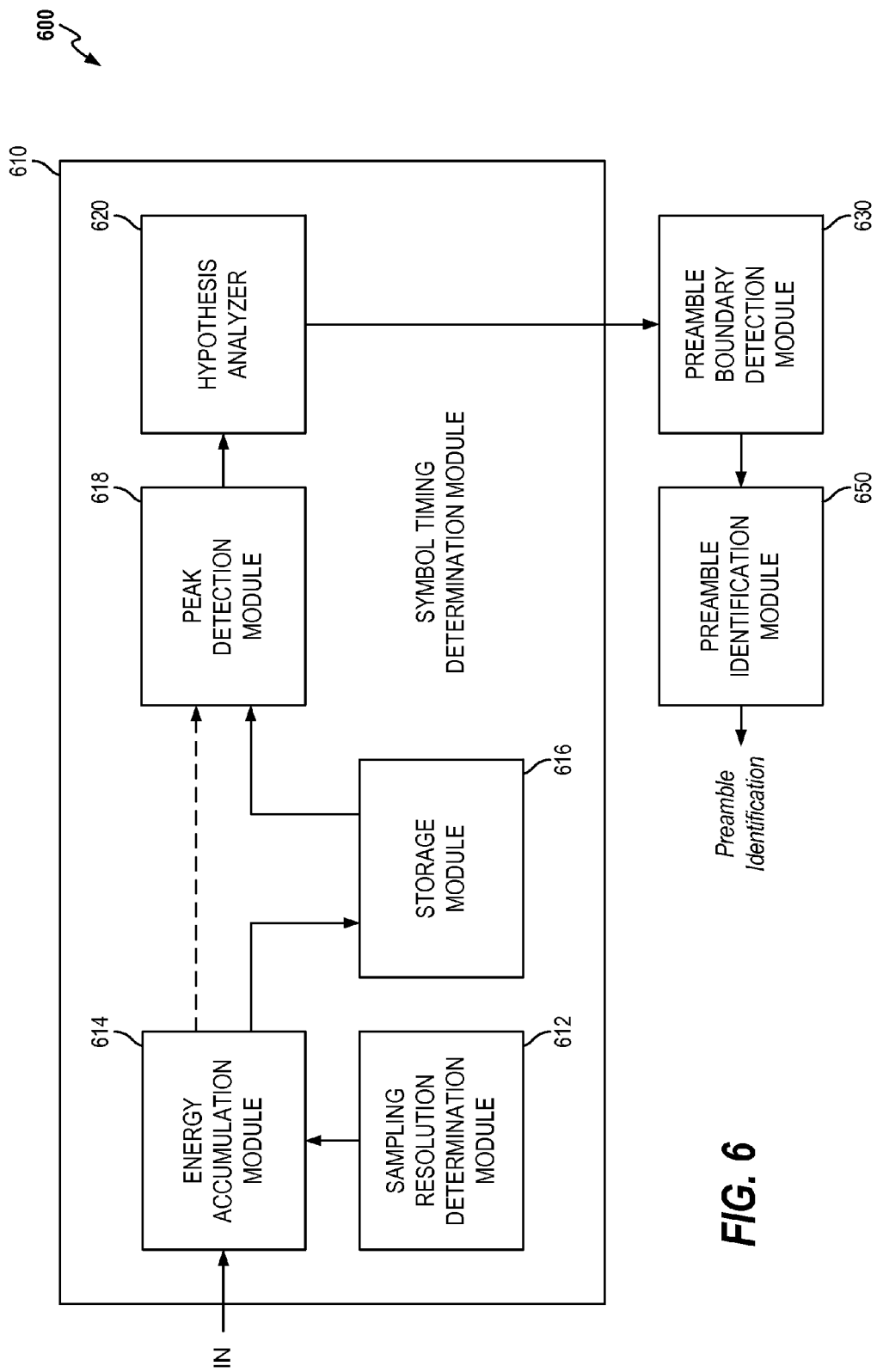
FIG. 6 is a block diagram of a packet preamble processing system configured in accordance with various aspects of the disclosed approach that may be used with the preamble acquisition process of FIG. 4.

The preamble acquisition process 400 may be performed by a packet header processing system 600 as shown in FIG. 6 implemented in accordance with various aspects of the disclosed approach. The packet header processing system 600 includes a symbol timing determination module 610 for identifying a possible timing alignment of received symbols associated with one or more preamble blocks of L symbols, from which a sequence of bits may be derived. The packet header processing system 600 also includes a preamble boundary detection module 630 for determining a boundary between each symbol in a preamble block in the sequences of bits, thereby allowing the packet header processing system 600 to determine a particular configuration of the one or more preamble blocks. The particular configuration of the one or more preamble blocks is associated with a preamble that may then be identified using a preamble identification module such that an end of the packet preamble and the beginning of the packet payload may be determined.

The packet header processing system 600 may be implemented in a receiver such as the second wireless device of 140 of FIG. 1 as the preamble detector 144 to process preamble sequences communicated from a transmitter such as the first wireless device 120 of FIG. 1. As described above, the preamble sequences may be received in the form of a sequence of symbols containing a packet preamble such as the plurality of preamble blocks 210 in the packet preamble 200 of FIG. 2.

Figure 5:
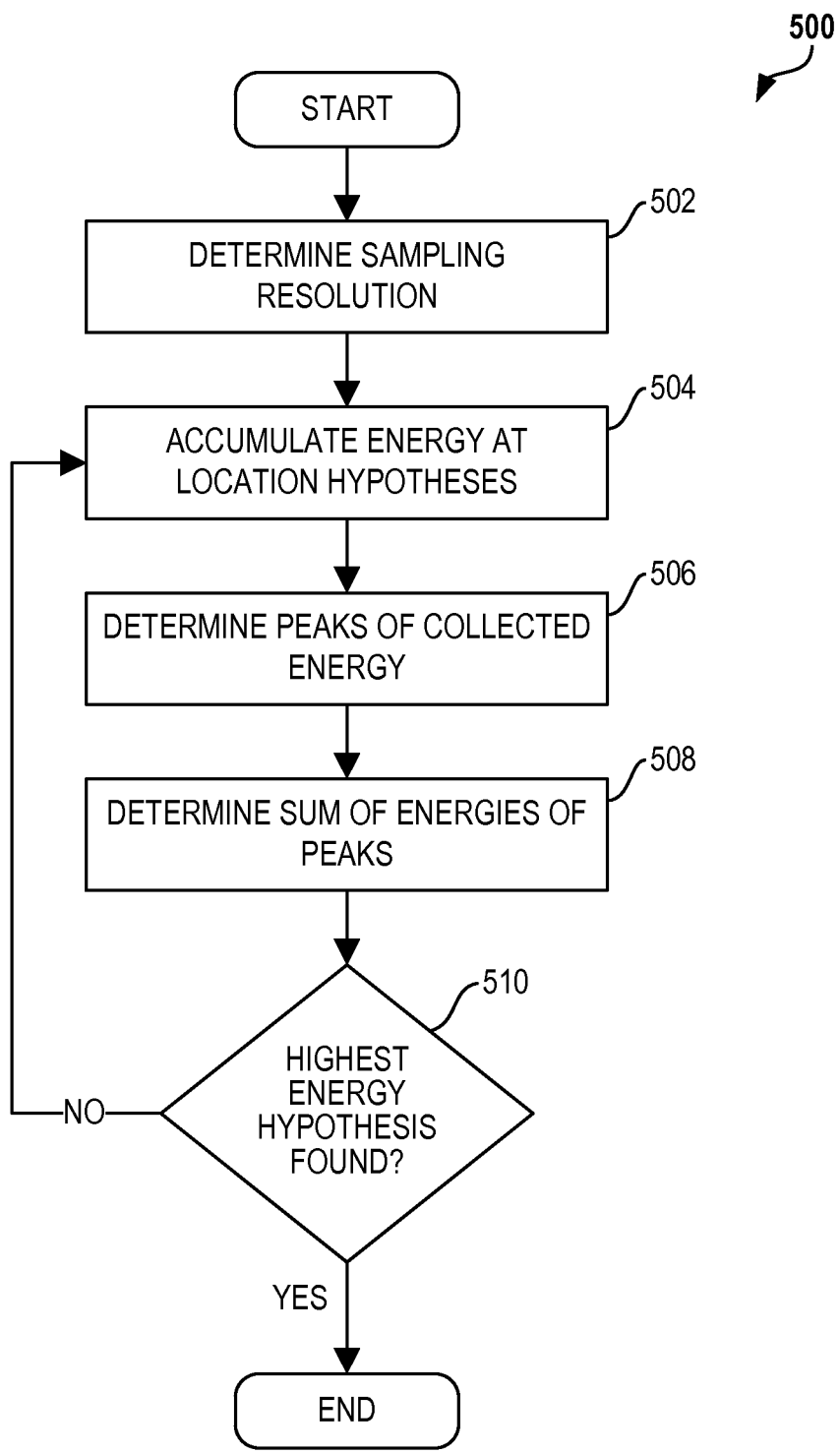
FIG. 5 is a flow diagram illustrating a symbol timing detection process configured in accordance with various aspects of the disclosed approach for efficient acquisition of preamble sequences.

FIG. 5 illustrates a symbol timing detection process 500 that may be used to implement the symbol timing detection phase 402 where, at 502, a sampling resolution determination module 612 in the symbol timing determination module 610 may determine a resolution at which to sample a received signal as part of determining symbol timing. Each sample represents an energy detected from the received signal. In one aspect of the disclosed approach, the sampling resolution determination module 612 may determine the sampling resolution by dividing an expected symbol duration into a number of samples. In one aspect of the disclosed approach, if the expected duration of each symbol is K slots (e.g., 128 slots), then the sampling resolution determination module 612 may divide the K slots into X samples and assign a number of time hypotheses Y to cover this duration of K slots. Each hypothesis will be referenced herein using an index y. This implies that a resolution of [X/Y] samples per hypothesis may be obtained by the sampling resolution determination module 612.

At 504, an energy accumulation module 614 in the symbol timing determination module 610 determines an amount of detected energy for each location in a plurality of locations in a storage module 616, where each location corresponds to a potential slot position of a transmission of energy for signaling a bit of a valid symbol. The energy accumulation module 614 may then store each determined amount in the storage module 616 in a cyclical manner, as further described herein. As used herein, the terms "collecting", "storing", "accumulating," or any grammatical form thereof as used for the term "energy" refers to an operation where an amount of energy is being detected such that a level of detected energy may be determined for each location. In one aspect of the disclosed approach, the energy accumulation module 614 may determine the amount of detected energy for a window having a length of time corresponding to a single block. In another aspect of the disclosed approach, the energy accumulation module 614 may determine the amount of detected energy for a window having a length of time corresponding to a plurality of blocks.

The storage module 616 may include a cyclical buffer having a number of buffer locations matched to a desired window size. In one aspect of the disclosed approach, the cyclical buffer may have a number of buffer locations matched to a number of slots used to communicate each symbol. The energy accumulation module 614 may start sampling a received signal at any time, and place a value representing each sample at a buffer location in the cyclical buffer sequentially. For example, the energy accumulation module 614 may place a value representing a first sample in a first buffer location. Then, a value representing each sample thereafter is placed into a subsequent buffer location until the last buffer location is reached, at which point the energy accumulation module 614 may place a value representing the next sample in the first buffer location. Because of the cyclical nature of the transmission, all the values representing the sample associated with the zeros will fall in the same buffer location because the values are stored cyclically. Similarly, all the values representing the samples associated with the ones will fall in another buffer location. As further discussed herein, hypotheses for the correct locations of $S_0$ and $S_1$ may be formulated by examining energies for two locations in the plurality of locations. The first being an expected slot location of $S_0$, and the second being $S_0+N$ because an expected location of $S_1$ should be spaced apart from $S_0$ by a number of slots N as described above with reference to FIG. 2. In other words, two buffer locations in the cyclical buffet, spaced apart by N, will have all values representing the energies associated with the zeros, and all values representing the energies associated with the ones, respectively. At this juncture, because possible symbol timing is being identified, In one aspect of the disclosed approach, the energy accumulation module 614 may accumulate energy for each hypothesis by accumulating energy for a plurality of samples. Thus, in the example provided herein, for each hypothesis 'y', energy for an adjacent number of Z samples may be accumulated. An example selection of parameters that may be used for the symbol timing detection process 500 is X=2,048, Y=512, and Z=8. In other words, each slot will be divided into 2,048 locations, with each location being sampled 512 times. A metric, referred to as "hypMet," may then be calculated based on energies for 8 locations adjacent to the current location combined with the current sample. In other words, the energies for 9 samples are combined for each hypMet. Therefore, in this example, a hypMet is calculated for 512 hypotheses. This calculation may be made modulo the total number of samples collected for acquisition (i.e., mod LX).

At 506, a peak detection module 618 determines the locations where there are peaks of the detected signal and provides that information to a hypothesis analyzer 620. When a signal is present, the hypothesis analyzer 620 expects that the peak detection module 618 will find two peaks at locations corresponding to the locations of $S_0$ and $S_1$ for each hypothesis. In one aspect of the disclosed approach, these positions are separated by N, which as noted herein is a distance that is not K/2 slots due to the choice of S0 and S1.

At 508, the hypothesis analyzer 620 may calculate a plurality of metrics for each hypothesis. In one aspect of the disclosed approach, the plurality of metrics for each hypothesis is designed to represent three peaks, corresponding to: (i) hypMet[y], which represents energy collected at the hypothesized position of the zeros, where y is a hypothesized value of $S_0$; (ii) hypMet[y+N], which represents energy collected at the hypothesized position of the ones, where y+N is a hypothesized value of $S_1$; as well as (iii) hypSum[y], which represents energy based on the combined amount of energies of (i) and (ii). Thus:

hypSum[$y$]=hypMet[$y$]+hypMet[mod($y+N,Y$)], where operation of mod(y+N,Y) provides what is referred to as a folding mechanism that allows a "wrapping around" of the slot indices for determining positions of $S_0$ and $S_1$ using a modulo function. The folding mechanism allows for efficient receiver processing while minimizing memory resources required for the acquisition process as memory requirements grows in proportion to log N for N pulses. Further, due to the choice of $S_0$ and $S_1$, the positions of three peaks are designed not to overlap.

At 510, the hypothesis analyzer 620 determines which hypothesis yields the largest metric of hypSum. In one aspect of the disclosed approach, the hypothesis that yields the maximum total energy while exceeding a certain threshold of energy in both zeros and ones is declared the winning candidate. In addition to providing detection of maximum energy (i.e., the largest hypSum), in one aspect of the disclosed approach the additional check of the energy in the zeros and ones provides greater immunity to interferers and noise as well. The additional check allows the hypothesis analyzer 620 to reject hypotheses in which a detected level of energy in one of the zeros or ones is large enough to skew the results of the search for the largest metric of hypSum, but insufficient to pass the threshold test for a level of detected energy in the other one of the zero or ones. Put in another way, because of the balanced weight property of the transmitted sequence, the hypothesis analyzer 620 would expect a potentially correct hypothesis to have a level of detected energy in the zeros to be the same, or about the same, as a level of detected energy in the ones. Ideally, the level of detected energy in the zeros will be equal to the level of detected energy in the ones. The hypothesis analyzer 620 may use a single threshold that relates to a difference between the level of detected energy between the zeros or the ones in a particular hypothesis to determine whether that hypothesis may be rejected, where the hypothesis analyzer 620 would consider the levels of detected energy to be equal if the difference is lower than the threshold. This threshold may be referred to as a relative difference of detected energy levels threshold. The hypothesis analyzer 620 may also use a separate threshold for each of the levels of detected energy for the zeros and the ones in a particular hypothesis to determine whether that hypothesis may be rejected, where the hypothesis analyzer 620 would consider the levels of detected energy to not be equal if one or more levels of detected energy was lower than a respective threshold.

For example, in a scenario where an interferer (or noise) that generates a large amount of energy that just so happens to fall on a location for the zeros in a particular hypothesis, the measured energy for the zeros in that hypothesis would be incorrectly based on that interferer energy. Assuming that the interferer energy is large enough to cause the metric hypSum for that hypothesis to be greater than any other hypothesis, that hypothesis would be incorrectly chosen if no check for an energy level of a hypothesized location of the ones to cross a threshold were to occur. However, where there is a check for that energy level, and assuming that energy level were lower than a threshold, the hypothesis analyzer 620 would determine that the hypSum metric calculated for that hypothesis is skewed by some sort of adverse condition. Assuming it is unlikely that an interferer energy level will be large enough in exactly the same two locations as correct locations for the zeros and the ones, using the property of the sequence that yields three non-overlapping peaks helps mitigate interference while allowing for a soft output accumulation of energy to optimize noise performance.

Referring again to FIG. 4, once symbol timing has been acquired from the process described above with reference to FIG. 5, at 404 the preamble boundary detection module 630 may, by using its knowledge of where the zeros and the ones should be transmitted, determine a symbol boundary separating each symbol in the preamble block of L symbols that make up the transmitted sequence. Specifically, because the preamble boundary detection module 630 knows where $S_0$ and $S_1$ should be found, it may match up the two slots where the highest energies are detected with $S_0$ and $S_1$. As discussed above, because of the values chosen for $S_0$, $S_1$, and N, there should be little ambiguity to where each symbol starts.

At 406, once the symbol boundary is determined, the preamble identification module 650 may detect a transmitted preamble using its particular knowledge of the particular configuration of the preamble blocks to identify a preamble block boundary, and then identify the preamble sequence in the received preamble. In one aspect of the disclosed approach, the transmitted preamble may be identified by a particular ordering of the symbols in each symbol block. The preamble identification module 650 may collect energy metrics at the expected locations for the zeros and the ones to store a sequence of L symbols. The preamble identification module 650 may then attempt to determine a boundary of the preamble block, where the preamble block boundary determination includes an uncertainty of L hypotheses corresponding to the L symbols that make up each preamble block. In one aspect of the disclosed approach, L preamble block boundary hypotheses are considered, and the one preamble block boundary hypothesis that provides a detected preamble block that maximizes a correlation property with an expected preamble block is declared as the winning hypothesis. In other words, each location of the L possible locations may be considered in turn as the start of the preamble block in the received sequence, and a hypothetical preamble block with each particular configuration of L symbols is cross-correlated with an expected preamble block sequence with length L. The starting position in the sequence of L symbols with the highest cross-correlation value may then be chosen as the start, or boundary, of the preamble block. Thus, the various aspects of the disclosed approach may take advantage of the correlation properties of the pseudorandom sequence used by the transmitter for the preamble block to identify the preamble. The transmitted preamble may be used to synchronize timing between devices as well as signal particular communication parameters.

In accordance with various aspects of the disclosed approach, a number of repetitions P of the preamble block of L symbols may be varied to support communication between a transmitter such as the first wireless device 120 and a receiver such as the second wireless device 140 using different data rate modes. For example, a stronger link may use a faster data rate mode and hence fewer repetitions of the preamble block, and vice versa for a weaker link. Thus, P may be smaller for faster data rate modes, and larger for slower data rate modes. This approach allows the acquisition to succeed if the received power is large enough regardless of what rate mode is being transmitted. No extra power is consumed for detecting preambles corresponding to each data rate mode, and the receiver can stop when required. These features are allowed by the incremental nature of the energy accumulation approach described herein.

FIG. 7 illustrates a balanced weight sequence generator 700 that may be used in accordance with various aspects of the preamble acquisition approach described herein. In one aspect of the disclosed approach, the balanced weight sequence generator 700 may include a random value generator that may be implemented using a linear feedback shift register (LFSR) 702, as illustrated in FIG. 7 as an n-bit LFSR that includes an n-bit register block 720, and driven by a clock 730 that provides a clock (CLK) signal to allow a random value to be generated for each clock cycle.

The random values generated by the LFSR 702 may be used by a preamble block assembly module 704 to generate symbol blocks from which a sequence generation module 706 may generate desired sequences using various aspects of the disclosed approach. Thus, as further described herein, the symbol block assembly/construction module 704 may assemble a set of symbol bocks with a desired pre-balanced property, and the sequence generation module 706 may generate (or create) sequences by choosing from these symbol blocks. In accordance with various aspects of the disclosed approach, the preamble sequences generated by the sequence generator 300 maintains the pre-balanced property introduced during the sequence generation process, which is to say that the preamble sequences are formed from combinations of symbols or symbol blocks that already have a balanced property but transformed in such a way that simultaneously allows generation of a large number of preamble sequences yet still does not lose the balanced property.

For example, the balanced weight sequence generator 700 may generate the pseudorandom sequences used by the preamble generator 122 of FIG. 1 to generate desired preamble sequences in accordance with various aspects of the disclosed approach. The LFSR 702 may also be used to generate the pseudorandom values used by the first wireless device 120 for determining hopping sequences for $S_0$ and $S_1$. The second wireless device 140 and the third wireless device 160 may also use a balanced weight sequence generator such as the balanced weight sequence generator 700 to generate the preamble and hopping sequences created by the first wireless device 120, as described herein.

A LFSR is a shift register whose output is a linear function of its previous state and, as illustrated, an output of the LFSR 702 is based on results received from an XOR function, implemented as an XOR gate 710 that receives inputs from the n-bit register block 720 with bits a[1]-a[n]. Because in an LFSR only some bits of the overall shift register value may be used in the XOR function, only a particular subset of the total number of registers in the n-bit register block 720 may be coupled to the XOR gate 710. This subset may be defined, where n=72, by a primitive sequence formula as shown below:

Primitive Sequence=$x^{72}+x^{68}+x^{65}+x^{63}+x^{62}+x^{59}+x^{56}+x^{55}+x^{52}+x^{45}+x^{43}+x^{41}+x^{40}+x^{39}+x^{37}+x^{36}+x^{35}+x^{31}+x^{30}+x^{27}+x^{24}+x^{23}+x^{18}+x^{15}+x^{13}+x^{11}+x^{10}+x^{8}+x^{7}+x^{5}+x^{4}+x^{3}+x^{2}+x^{1}$, where $\{x^i\}$ may represent a connection to the XOR gate 710 of a register at an index i in the n-bit register block 720, and:

i ∈ {1, 2, 3, 4, 5, 7, 8, 10, 11, 13, 15, 18, 23, 24, 27, 30, 31, 35, 36, 37, 39, 40, 41, 43, 45, 52, 55, 56, 59, 62, 63, 65, 68, 72}.

The LFSR 702 may be initialized by using a particular set of values in the n-bit register block 720, referred to as a seed and illustrated as being received in a "SEED" input in the figure. In one aspect of the disclosed approach, the seed may be shared between two wireless devices so that each of them may generate the same random values to be used to produce an identical set of preamble and hopping sequences. For example, the first wireless device 120 and the second wireless device 140 may share a first seed so that each of them may generate a first set of preamble and hopping sequences. The first wireless device 120 and the third wireless device 160 may share a second seed different from the first seed so that each of them may generate a second, different set of preamble and hopping sequences. In accordance with various aspects of the disclosed approach, the seeds may be pre-shared and a selection process may be used to minimize or eliminate a duplicate seed being used by wireless devices in a communication scheme, such as the second wireless device 140 and the third wireless device 160 using the same seed to create the same preamble and/or hopping sequences for communicating with the first wireless device 120.

A wireless node such as any one of the wireless devices described herein may include various components that perform functions based on signals (e.g., including information such as data) that are transmitted by or received at the wireless node (e.g., via a transmitter or receiver). For example, a wireless headset may include a transducer configured to provide an audio output based on the information or provide an audio output that associated with (e.g., based on or used to control transmission of) data that is transmitted in conjunction with a synchronization signal. A wireless watch may include a user interface configured to provide an indication based on the information or provide an indication that associated with (e.g., based on or used to control transmission of) data that is transmitted in conjunction with a synchronization signal. A wireless sensing device may include a sensor configured to sense based on the information (e.g., based on a request included in the information) or configured to provide data that is transmitted in conjunction with a synchronization signal.

A wireless node such as any one of the wireless devices described herein may communicate via one or more wireless communication links that are based on or otherwise support any suitable wireless communication technology. For example, in some aspects of the disclosed approach, a wireless node may associate with a network. In some aspects the network may include a personal area network (e.g., supporting a wireless coverage area on the order of 30 meters) or a body area network (e.g., supporting a wireless coverage area on the order of 10 meters) implemented using ultra-wideband technology or some other suitable technology. In some aspects the network may include a local area network or a wide area network. A wireless node may support or otherwise use one or more of a variety of wireless communication technologies, protocols, or standards such as, for example, CDMA, TDMA, OFDM, OFDMA, WiMAX, and Wi-Fi. Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a device may include a wireless transceiver with associated transmitter and receiver components that may include various components (e.g., signal generators and signal processors) that facilitate communication over a wireless medium.

In some aspects, a wireless node such as one of the wireless devices described herein may communicate via an impulse-based wireless communication link. For example, an impulse-based wireless communication link may utilize ultra-wideband pulses that have a relatively short length (e.g., on the order of a few nanoseconds or less) and a relatively wide bandwidth. The ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a computer, a point-of-sale device, an entertainment device, a hearing aid, a set-top box, or any other suitable device. These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects, a wireless node such as one of the wireless devices described herein may include an access device (e.g., an access point) for a communication system. Such an access device may provide, for example, connectivity to another network (e.g., a wide area network such as the Internet or a cellular network) via a wired or wireless communication link. Accordingly, the access device may enable another device (e.g., a wireless station) to access the other network or some other functionality. In addition, it should be appreciated that one or both of the devices may be portable or, in some cases, relatively non-portable. Also, it should be appreciated that a wireless node also may be capable of transmitting and/or receiving information in a non-wireless manner (e.g., via a wired connection) via an appropriate communication interface.

Figure 8:
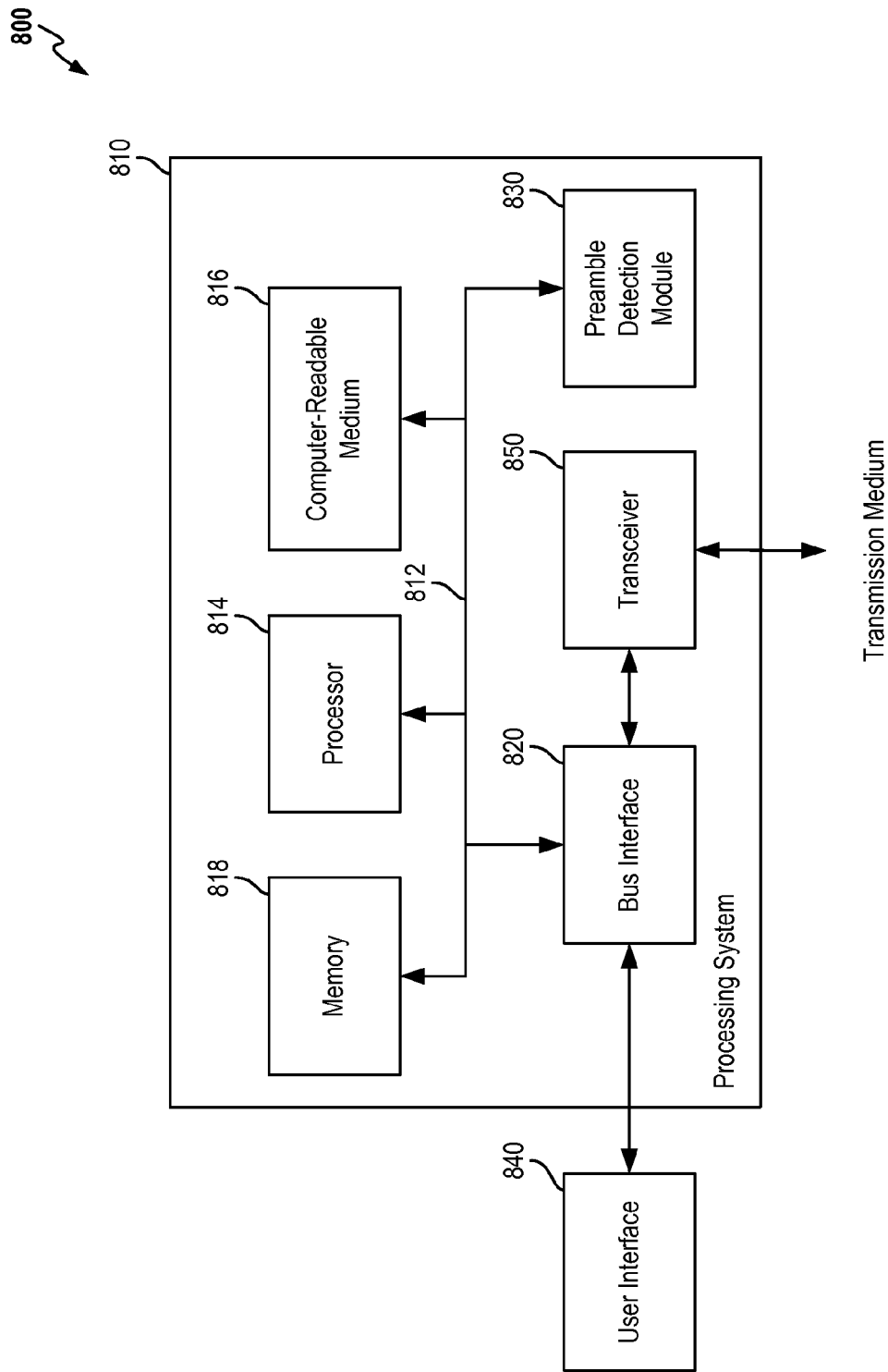
FIG. 8 is a block diagram illustrating an example of a hardware implementation for an apparatus employing a processing system configured in accordance with various aspects of the preamble sequence generation process described herein.

FIG. 8 is a conceptual diagram illustrating an example of a hardware implementation for an apparatus 800 employing a processing system 810 that may be used in accordance with various aspects of the disclosed approach for efficient preamble acquisition. Thus, in accordance with various aspects of the disclosure, an element, or any portion of an element, or any combination of elements for efficient preamble acquisition and use thereof in a communication protocol, including a wireless node, may be implemented with the processing system 810.

The processing system 810 includes a preamble detection module 830 that may be configured in accordance with various aspects of the disclosed approach to provide the functionality as described herein to acquire preamble sequences in combination with other elements in the processing system 810. For example, the processing system 810 includes one or more processors illustrated as a processor 814. Examples of processors 814 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processor 814 may be used by the preamble detection module 830 to perform such functions as random number generation in a manner as described for the LFSR 702, as illustrated in FIG. 7. The processor 814 may be also used by the preamble detection module 830 to assemble or construct preamble blocks in a manner as described for the preamble block construction module 704 as illustrated in FIG. 7 to reconstruct the same preamble blocks as those transmitted by a transmitter such as the first wireless device 120 for the identification of the transmitted preamble using the preamble blocks. Further, the processor 814 may be used by the preamble detection module 830 to generate hopping sequences in a manner as described for the sequence generation module 706.

In this example, the processing system 810 may be implemented as having a bus architecture, represented generally by a bus 812. The bus 812 may include any number of interconnecting buses and bridges depending on the specific application of the processing system 810 and overall design constraints. The bus 812 links together various circuits including one or more processors (represented generally by the processor 814), a memory 818, and computer-readable media (represented generally by a computer-readable medium 816). The bus 812 may also link various other circuits such as timing sources, peripherals, voltage regulators, and power management circuits, which are well known in the art, and therefore, will not be described any further. A bus interface 820 provides an interface between the bus 812 and a transceiver 850. The transceiver 850 provides a means for communicating with various other apparatus over a transmission medium. Depending upon the nature of the apparatus, a user interface 840 (e.g., keypad, display, speaker, microphone, joystick) may also be provided.

The processor 814 is responsible for managing the bus 812 and general processing, including execution of software that may be stored on the computer-readable medium 816 or the memory 818. The software, when executed by the processor 814, causes the processing system 810 to perform the various functions described herein for any particular apparatus. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The computer-readable medium 816 or the memory 818 may also be used for storing data that is manipulated by the processor 814 when executing software. For example, this data may include information about the energies captured from a received signal, generated or assembled preamble blocks, hopping sequences, seed values used in the balanced weight sequence generator, and the random numbers used to generate the preamble blocks. This data may also include any variables or temporary storage values needed for operation of the apparatus 800, including any temporary storage needed to cache hypothesis calculations.

The computer-readable medium 816 may be a non-transitory computer-readable medium such as a computer-readable storage medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. Although illustrated as residing in the processing system 810, the computer-readable medium 816 may reside externally to the processing system 810, or distributed across multiple entities including the processing system 810. The computer-readable medium 816 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one configuration, wireless nodes for wireless communication such as the first wireless device 120, the second wireless device 140, and the third wireless device 160 may include means for efficient preamble acquisition in accordance with one aspects of the disclosed approach where the wireless nodes may include means for creating a plurality of synchronization hypotheses, wherein each hypothesis being created based on energies sampled at a first location and a second location in a plurality of locations associated with a sequence of transmitted symbols; means for calculating a plurality of metrics based on the plurality of synchronization hypotheses, wherein each metric is associated with a hypothesis; means for selecting, as a candidate, a hypothesis from the plurality of synchronization hypotheses including a maximum associated metric; and means for determining a boundary in the sequence of transmitted symbols based on a correlation property of the sequence of transmitted symbols. Further, the wireless node may include means for identifying a preamble based on the identified boundary. In one aspect of the disclosed approach, the aforementioned means may include the sampling resolution determination module 612 for creating a plurality of synchronization hypotheses. The means for calculating a plurality of metrics based on the plurality of synchronization hypotheses may include the hypothesis analyzer 620. The means for determining a boundary in the sequence of transmitted symbols may be the preamble boundary detection module 630. The means for identifying a preamble based on the identified boundary may be the preamble identification module 650. These and other means may be implemented by the preamble detection module 830 in the processing system 810 of FIG. 8. Further, one or more processors in the processing system 810 may be configured as means for performing the functions recited by the aforementioned means. In yet another aspect, the aforementioned means may be a module or any apparatus configured to perform the functions recited by the aforementioned means.

In another configuration, wireless nodes for wireless communication such as the first wireless device 120, the second wireless device 140, and the third wireless device 160 may include means for efficient preamble acquisition in accordance with one aspects of the disclosed approach where the wireless nodes may include means for creating a plurality of synchronization hypotheses, wherein each hypothesis being created based on energies sampled at a first location and a second location in a plurality of locations associated with a sequence of transmitted symbols, wherein the second location includes a predetermined offset from the first location configured to provide enhanced interference immunity; means for calculating a plurality of metrics based on the plurality of synchronization hypotheses, wherein each metric is associated with a hypothesis; and, means for selecting, as a candidate, a hypothesis from the plurality of synchronization hypotheses including a maximum associated metric. Further, the wireless node may include means for identifying a preamble based on the identified boundary. In one aspect of the disclosed approach, the aforementioned means may include the sampling resolution determination module 612 for creating a plurality of synchronization hypotheses. The means for calculating a plurality of metrics based on the plurality of synchronization hypotheses may include the hypothesis analyzer 620. The means for selecting, as a candidate, a hypothesis from the plurality of synchronization hypotheses including a maximum associated metric may also include the hypothesis analyzer 620. The means for identifying a preamble based on the identified boundary may be the preamble identification module 650. These and other means may be implemented by the preamble detection module 830 in the processing system 810 of FIG. 8. Further, one or more processors in the processing system 810 may be configured as means for performing the functions recited by the aforementioned means. In yet another aspect, the aforementioned means may be a module or any apparatus configured to perform the functions recited by the aforementioned means.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may include a computer-readable medium including codes (e.g., executable by at least one computer) relating to one or more of the aspects of the disclosure. In some aspects a computer program product may include packaging materials.

Figure 9:
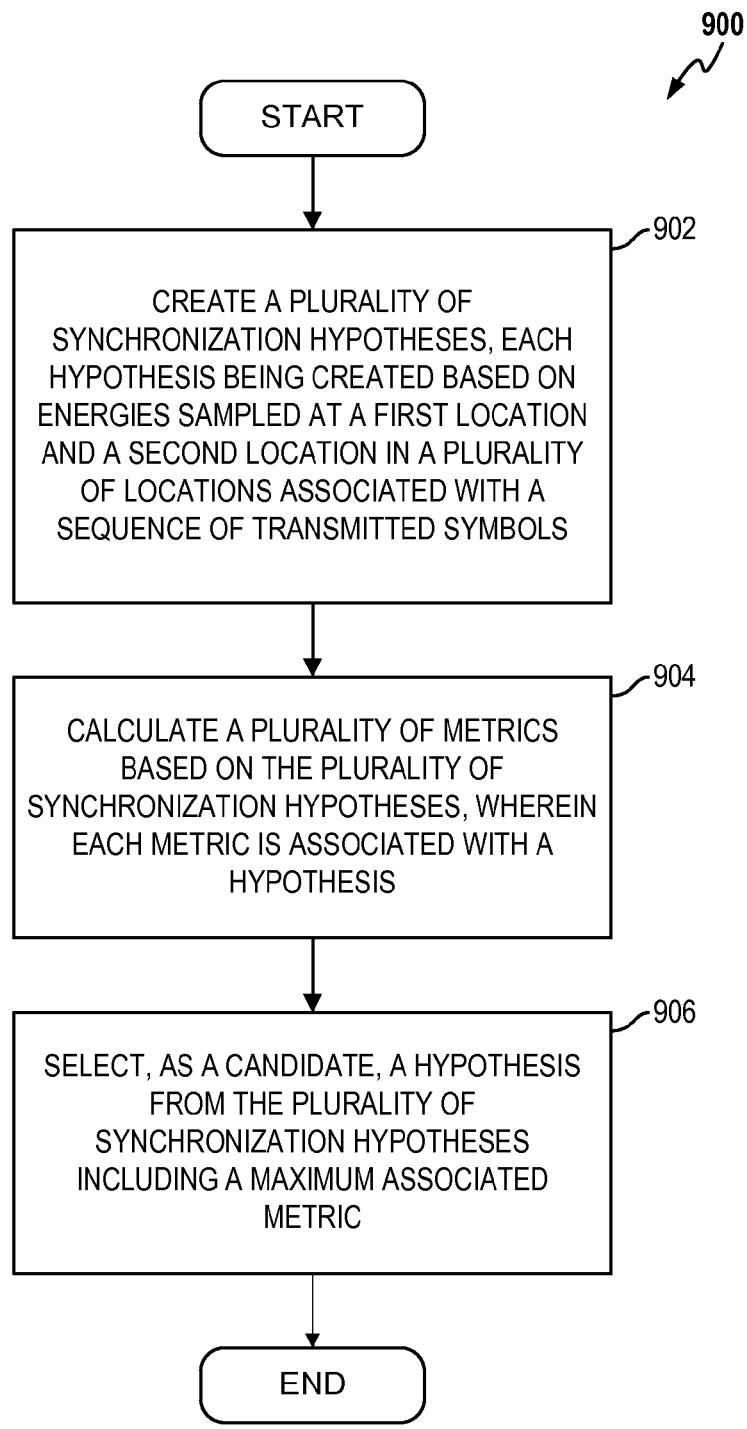
FIG. 9 is a flow diagram illustrating a preamble acquisition process configured in accordance with various aspects of the disclosed approach for efficient preamble acquisition.

As another example of some of the various aspects of the disclosed approach, FIG. 9 illustrates a wireless communication process 900 that may be configured to efficiently acquire preambles transmitted using sequences such as balanced weight preamble sequences where, at 902, a plurality of synchronization hypotheses is created, with each hypothesis being created based on energies sampled at a first location and a second location in a plurality of locations associated with a sequence of transmitted symbols. Then, at 904, a plurality of metrics is calculated based on the plurality of synchronization hypotheses, wherein each metric is associated with a hypothesis. From the plurality of synchronization hypotheses, a hypothesis may be selected at 906 as a candidate that includes a maximum associated metric. A boundary in the sequence of transmitted symbols based on a correlation property of the sequence of transmitted symbols may be determined after the hypothesis with the maximum associated metric has been selected.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Unless specifically stated otherwise, the term "some" refers to one or more. A phrase referring to "at least one of" a list of items refers to any combination of those items, including single members. As an example, "at least one of: A, B, or C" is intended to cover: A; B; C; A and B; A and C; B and C; and A, B and C.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for preamble acquisition comprising:
   creating a plurality of synchronization hypotheses, with each hypothesis being created based on energies sampled at a first location and a second location in a plurality of locations associated with a sequence of transmitted symbols;
   calculating a plurality of metrics based on the plurality of synchronization hypotheses, wherein each metric is associated with a hypothesis; and,
   selecting, as a candidate, one hypothesis from the plurality of synchronization hypotheses comprising a maximum associated metric.

2. The method of claim 1, further comprising determining a boundary in the sequence of transmitted symbols based on a correlation property of the sequence of transmitted symbols.

3. The method of claim 1, wherein the sequence of transmitted symbols comprises an equal number of each symbol from a symbol set such that the sequence of transmitted symbols comprises a balanced weight characteristic.

4. The method of claim 1, wherein respective values based on the energies sampled at the first location and the second location are stored in a cyclical buffer at a first buffer location and a second buffer location, respectively.

5. The method of claim 1, wherein creating each hypothesis of the plurality of synchronization hypotheses comprises:
   detecting a first amount of energy measured near the first location in the plurality of locations associated with the sequence; and
   detecting a second amount of energy measured near the second location in the plurality of locations.

6. The method of claim 1, wherein calculating each metric comprises:
   determining whether the energies sampled at the first location and the second location are above a first threshold; and
   determining if a combined amount of the energies sampled at the first location and the second location is above a second threshold.

7. The method of claim 6, wherein the maximum associated metric comprises a largest combined amount of the energies sampled at the first location and the second location.

8. The method of claim 7, wherein the energies sampled at the first location and the second location are above the first threshold.

9. The method of claim 1, wherein the energies sampled at the first location and the second location each comprises a plurality of samples.

10. The method of claim 9, wherein the plurality of samples comprises a subset of all samples of the energies sampled at the first location and the second location, respectively.

11. The method of claim 1, wherein the second location is located at a predetermined offset from the first location.

12. The method of claim 11, wherein the predetermined offset is configured to provide enhanced interference immunity.

13. The method of claim 1, wherein the sequence of transmitted symbols comprises a first symbol and a second symbol selected from a symbol set.

14. The method of claim 13, wherein the energies sampled at the first location and the second location are associated with respective hypothesized transmissions of energies for signaling transmissions of the first symbol and the second symbol.

15. The method of claim 14, wherein the sequence of transmitted symbols comprises a plurality of blocks, each block conveying an identical number of symbols using the first location for the first symbol and the second location for the second symbol.

16. The method of claim 15, wherein the sequence of transmitted symbols comprises another plurality of blocks, each block in the other plurality of blocks conveying an identical number of symbols using a third location for the first symbol and a fourth location for the second symbol.

17. The method of claim 16, wherein the first location, the second location, the third location, and the fourth location are associated with a hopping sequence configured with different locations for the first symbol and the second symbol.

18. An apparatus for preamble acquisition comprising:
   a processor; and
   a memory coupled to the processor comprising instructions executable by the processor for:
      creating a plurality of synchronization hypotheses, with each hypothesis being created based on energies sampled at a first location and a second location in a plurality of locations associated with a sequence of transmitted symbols;
      calculating a plurality of metrics based on the plurality of synchronization hypotheses, wherein each metric is associated with a hypothesis; and,
      selecting, as a candidate, one hypothesis from the plurality of synchronization hypotheses comprising a maximum associated metric.

19. The apparatus of claim 18, wherein the memory further comprising instructions executable by the processor for determining a boundary in the sequence of transmitted symbols based on a correlation property of the sequence of transmitted symbols.

20. The apparatus of claim 18, wherein the sequence of transmitted symbols comprises an equal number of each symbol from a symbol set such that the sequence of transmitted symbols comprises a balanced weight characteristic.

21. The apparatus of claim 18, further comprising a cyclical buffer comprising a plurality of buffer locations, wherein respective values based on the energies sampled at the first location and the second location are stored at a first buffer location and a second buffer location, respectively, of the plurality of buffer locations.

22. The apparatus of claim 18, wherein the instructions executable by the processor for creating each hypothesis of the plurality of synchronization hypotheses comprises instructions executable by the processor for:
   detecting a first amount of energy measured near the first location in the plurality of locations associated with the sequence; and
   detecting a second amount of energy measured near the second location in the plurality of locations.

23. The apparatus of claim 18, wherein the instructions executable by the processor for calculating each metric comprises instructions executable by the processor for:
   determining whether the energies sampled at the first location and the second location are above a first threshold; and
   determining if a combined amount of the energies sampled at the first location and the second location is above a second threshold.

24. The apparatus of claim 23, wherein the maximum associated metric comprises a largest combined amount of the energies sampled at the first location and the second location.

25. The apparatus of claim 24, wherein the energies sampled at the first location and the second location are above the first threshold.

26. The apparatus of claim 18, wherein the energies sampled at the first location and the second location each comprises a plurality of samples.

27. The apparatus of claim 26, wherein the plurality of samples comprises a subset of all samples of the energies sampled at the first location and the second location, respectively.

28. The apparatus of claim 18, wherein the second location is located at a predetermined offset from the first location.

29. The apparatus of claim 28, wherein the predetermined offset is configured to provide enhanced interference immunity.

30. The apparatus of claim 18, wherein the sequence of transmitted symbols comprises a first symbol and a second symbol selected from a symbol set.

31. The apparatus of claim 30, wherein the energies sampled at the first location and the second location are associated with respective hypothesized transmissions of energies for signaling transmissions of the first symbol and the second symbol.

32. The apparatus of claim 31, wherein the sequence of transmitted symbols comprises a plurality of blocks, each block conveying an identical number of symbols using the first location for the first symbol and the second location for the second symbol.

33. The apparatus of claim 32, wherein the sequence of transmitted symbols comprises another plurality of blocks, each block in the other plurality of blocks conveying an identical number of symbols using a third location for the first symbol and a fourth location for the second symbol.

34. The apparatus of claim 33, wherein the first location, the second location, the third location, and the fourth location are associated with a hopping sequence configured with different locations for the first symbol and the second symbol.

35. An apparatus for preamble acquisition comprising:
  means for creating a plurality of synchronization hypotheses, with each hypothesis being created based on energies sampled at a first location and a second location in a plurality of locations associated with a sequence of transmitted symbols;
  means for calculating a plurality of metrics based on the plurality of synchronization hypotheses, wherein each metric is associated with a hypothesis; and,
  means for selecting, as a candidate, one hypothesis from the plurality of synchronization hypotheses comprising a maximum associated metric.

36. The apparatus of claim 35, further comprising means for determining a boundary in the sequence of transmitted symbols based on a correlation property of the sequence of transmitted symbols.

37. The apparatus of claim 35, wherein the sequence of transmitted symbols comprises an equal number of each symbol from a symbol set such that the sequence of transmitted symbols comprises a balanced weight characteristic.

38. The apparatus of claim 35, further comprising a cyclical buffer comprising a plurality of buffer locations, wherein respective values based on the energies sampled at the first location and the second location are stored at a first buffer location and a second buffer location, respectively, of the plurality of buffer locations.

39. The apparatus of claim 35, wherein the means for creating each hypothesis of the plurality of synchronization hypotheses comprises:
  means for detecting a first amount of energy measured near the first location in the plurality of locations associated with the sequence; and
  means for detecting a second amount of energy measured near the second location in the plurality of locations.

40. The apparatus of claim 35, wherein the means for calculating each metric comprises:
  means for determining whether the energies sampled at the first location and the second location are above a first threshold; and
  means for determining if a combined amount of the energies sampled at the first location and the second location is above a second threshold.

41. The apparatus of claim 40, wherein the maximum associated metric comprises a largest combined amount of the energies sampled at the first location and the second location.

42. The apparatus of claim 41, wherein the energies sampled at the first location and the second location are above the first threshold.

43. The apparatus of claim 35, wherein the energies sampled at the first location and the second location each comprises a plurality of samples.

44. The apparatus of claim 43, wherein the plurality of samples comprises a subset of all samples of the energies sampled at the first location and the second location, respectively.

45. The apparatus of claim 35, wherein the second location is located at a predetermined offset from the first location.

46. The apparatus of claim 45, wherein the predetermined offset is configured to provide enhanced interference immunity.

47. The apparatus of claim 35, wherein the sequence of transmitted symbols comprises a first symbol and a second symbol selected from a symbol set.

48. The apparatus of claim 47, wherein the energies sampled at the first location and the second location are associated with respective hypothesized transmissions of energies for signaling transmissions of the first symbol and the second symbol.

49. The apparatus of claim 48, wherein the sequence of transmitted symbols comprises a plurality of blocks, each block conveying an identical number of symbols using the first location for the first symbol and the second location for the second symbol.

50. The apparatus of claim 49, wherein the sequence of transmitted symbols comprises another plurality of blocks, each block in the other plurality of blocks conveying an identical number of symbols using a third location for the first symbol and a fourth location for the second symbol.

51. The apparatus of claim 50, wherein the first location, the second location, the third location, and the fourth location are associated with a hopping sequence configured with different locations for the first symbol and the second symbol.

52. A computer program product for preamble acquisition comprising:
  a machine-readable storage medium comprising instructions stored thereon, wherein the instructions are embodied as code executable for:
    creating a plurality of synchronization hypotheses, with each hypothesis being created based on energies sampled at a first location and a second location in a plurality of locations associated with a sequence of transmitted symbols;
    calculating a plurality of metrics based on the plurality of synchronization hypotheses, wherein each metric is associated with a hypothesis; and,
    selecting, as a candidate, one hypothesis from the plurality of synchronization hypotheses comprising a maximum associated metric.

53. The computer program product of claim 52, wherein the machine-readable storage medium further comprises instructions stored thereon embodied as code executable for determining a boundary in the sequence of transmitted symbols based on a correlation property of the sequence of transmitted symbols.

54. The computer program product of claim 52, wherein the sequence of transmitted symbols comprises an equal number of each symbol from a symbol set such that the sequence of transmitted symbols comprises a balanced weight characteristic.

55. The computer program product of claim 52, wherein respective values based on the energies sampled at the first location and the second location are stored in a cyclical buffer at a first buffer location and a second buffer location, respectively.

56. The computer program product of claim 52, wherein the code executable for creating each hypothesis of the plurality of synchronization hypotheses comprises code executable for:

detecting a first amount of energy measured near the first location in the plurality of locations associated with the sequence; and detecting a second amount of energy measured near the second location in the plurality of locations.

57. The computer program product of claim 52, wherein the code executable for calculating each metric comprises code executable for:

determining whether the energies sampled at the first location and the second location are above a first threshold; and determining if a combined amount of the energies sampled at the first location and the second location is above a second threshold.

58. The computer program product of claim 57, wherein the maximum associated metric comprises a largest combined amount of the energies sampled at the first location and the second location.

59. The computer program product of claim 58, wherein the energies sampled at the first location and the second location are above the first threshold.

60. The computer program product of claim 52, wherein the energies sampled at the first location and the second location each comprises a plurality of samples.

61. The computer program product of claim 60, wherein the plurality of samples comprises a subset of all samples of the energies sampled at the first location and the second location, respectively.

62. The computer program product of claim 52, wherein the second location is located at a predetermined offset from the first location.

63. The computer program product of claim 62, wherein the predetermined offset is configured to provide enhanced interference immunity.

64. The computer program product of claim 52, wherein the sequence of transmitted symbols comprises a first symbol and a second symbol selected from a symbol set.

65. The computer program product of claim 64, wherein the energies sampled at the first location and the second location are associated with respective hypothesized transmissions of energies for signaling transmissions of the first symbol and the second symbol.

66. The computer program product of claim 65, wherein the sequence of transmitted symbols comprises a plurality of blocks, each block conveying an identical number of symbols using the first location for the first symbol and the second location for the second symbol.

67. The computer program product of claim 66, wherein the sequence of transmitted symbols comprises another plurality of blocks, each block in the other plurality of blocks conveying an identical number of symbols using a third location for the first symbol and a fourth location for the second symbol.

68. The computer program product of claim 67, wherein the first location, the second location, the third location, and the fourth location are associated with a hopping sequence configured with different locations for the first symbol and the second symbol.

* * * * *